M. LEWIS.
Draft-Equalizer.

No. 206,737.  Patented Aug. 6, 1878.

WITNESSES:
Henry N. Miller
C. Sedgwick

INVENTOR:
M. Lewis
BY
ATTORNEYS.

UNITED STATES PATENT OFFICE.

MOSES LEWIS, OF UTICA, ILLINOIS.

IMPROVEMENT IN DRAFT-EQUALIZERS.

Specification forming part of Letters Patent No. 206,737, dated August 6, 1878; application filed May 28, 1878.

*To all whom it may concern:*

Be it known that I, MOSES LEWIS, of Utica, in the county of La Salle and State of Illinois, have invented a new and Improved Equalizing-Bar, of which the following is a specification:

My invention consists in a novel combination and arrangement of equalizing bars, levers, and whiffletrees, and of tugs, pulleys, and clevises appertaining thereto, adjustable with relation to each other, and to the draft-pole or tongue of the vehicle, whereby an apparatus is produced which may be readily adjusted to adapt it to be used with two, three, four, or more horses.

Figure 1:
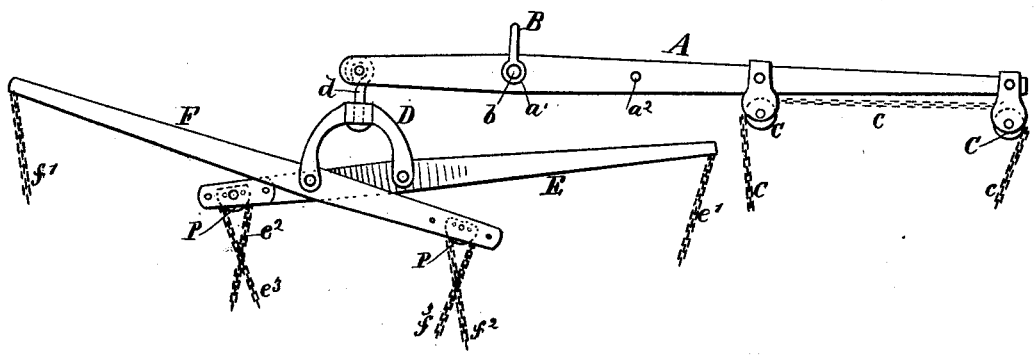
Figure 2:
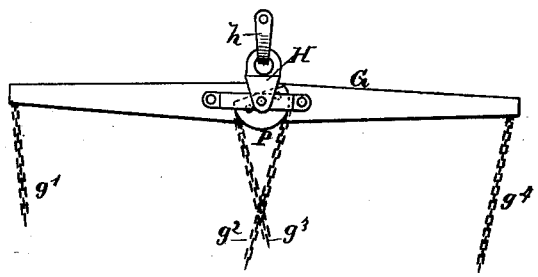
Figure 3:
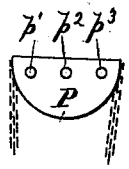

The accompanying drawing represents an equalizer embodying my improvements, Figure 1 showing an arrangement for four horses, and Fig. 2 an arrangement for two horses. Fig. 3 is a detail view.

Similar letters of reference indicate corresponding parts.

A represents a lever to be connected to the draft pole or tongue of the vehicle by means of a clevis, B, which may be attached to the lever A, at either of two different points, by passing its bolt $b$ through one of the two holes, $a^1$ $a^2$, and thereby changing the fulcrum. The long arm of the lever A carries two pulleys, C C, around which passes a tug chain, $c$, for one horse.

D represents what may be called a "double-center clevis," or, in other words, a clevis for connecting two levers with a third one. It consists of a curved bar, with both of its ends forked and perforated, and carrying in said forks two levers, E F, secured by bolts passing through them and through the perforations in the forks. About midway of its length the clevis D is provided with a swivel-hook, $d$, for attaching it to the lever A. The forked ends of the clevis D occupy different planes, so that the two levers E F work freely without interfering with each other. Said levers are arranged with their short arms nearest each other. The lever E has a tug-chain, $e^1$, attached to its long arm, and its short arm is provided with two tug-chains, $e^2$ $e^3$, attached to a semicircular plate, P, of the form shown in Fig. 3, which plate is pivoted in a slot in said lever. The lever F has a tug-chain, $f^1$, attached to its long arm, and its short arm is provided with two tug-chains, $f^2$ $f^3$, attached to a similar plate, P, arranged as described.

The plate P, shown in Fig. 3, is made the shape of a semicircle or of a segment formed by an arc and chord with the chains attached at the ends of the chord, in order that it may act both as a lever and a pulley, and it is provided with three different holes, $p^1$ $p^2$ $p^3$, for the reception of the bolt which serves as its pivot, in order to change its fulcrum as a lever, when desired, and thus to provide for difference in strength of horses.

In Fig. 2, G represents a lever, pivoted midway of its length to a clevis, H, provided with a loop, $h$, for attaching it to the draft pole or tongue, or to the lever A, as hereinafter described.

At the two ends of the lever are attached two tug-chains, $g^1$ $g^4$, and midway between them are two tug-chains, $g^2$ $g^3$, attached to one of the plates P, before described, which may be pivoted by means of the same bolt which connects the lever to the clevis H.

The equalizer shown in Fig. 2 is used for two horses, the traces of one horse being hooked to the chains $g^1$ $g^2$, and of the other horse to the chains $g^3$ $g^4$.

The equalizer shown in Fig. 1 is used for four horses. In such case the traces of the first horse are hooked to chains $c$ $c$, of the second to chains $c^1$ $f^2$, of the third to chains $f^3$ $e^3$, and of the fourth to chains $e^2$ $f^1$.

When three horses are to be used, the clevis D and levers E F may be detached from the lever A, and the lever G and its appurtenances substituted therefor, the clevis B being adjusted as required; or, instead of this arrangement, the clevis D and its appurtenances may be detached from the lever A, and connected directly to the draft-pole after detaching lever A therefrom.

When five horses are to be used, the clevis D and its appurtenances remain in place, as shown in Fig. 1, and the pulleys C C and chain $c$ are removed, and the lever G and its appurtenances are substituted therefor, being attached at the proper point to the long arm of the lever, and the clevis B adjusted as required.

Having thus described my invention, what I claim as new, and desire to secure by Letters Patent, is—

The lever A, connected with tongue by clevis B, and having pulleys C C, in combination with the swiveled curved bar D and levers E F, the latter having pivoted segmental plates P at their short ends, as shown and described, for the purpose specified.

<div style="text-align:right">MOSES LEWIS.</div>

Witnesses:
  C. S. GILBERT,
  A. T. GRIFFIN.